(12) United States Patent
Ramsey (10) Patent No.: US 7,503,586 B2
(45) Date of Patent: Mar. 17, 2009

(54) VEHICLE FRAME HAVING AIR TANK CROSS MEMBER

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 210 days.

(21) Appl. No.: 11/620,210

(22) Filed: Jan. 5, 2007

(65) Prior Publication Data

US 2007/0102913 A1 May 10, 2007

Related U.S. Application Data

(63) Continuation-in-part of application No. 10/669,106, filed on Sep. 22, 2003, now abandoned.

(51) Int. Cl.
B62D 21/16 (2006.01)
(52) U.S. Cl. .............................. 280/783; 280/124.157; 280/831
(58) Field of Classification Search ................. 280/782, 280/783, 831, 124.161, 124.157; B62D 21/16
See application file for complete search history.

(56) References Cited

U.S. PATENT DOCUMENTS

| | | | | |
|---|---|---|---|---|
| 1,198,885 A | * | 9/1916 | Billinghurst | 280/124.163 |
| 1,264,094 A | * | 4/1918 | Laisne | 280/783 |
| 2,913,252 A | * | 11/1959 | Norrie | 280/6.159 |
| 2,914,339 A | * | 11/1959 | Gouirand | 280/6.16 |
| 3,008,729 A | * | 11/1961 | Muller et al. | 280/5.509 |
| 3,880,445 A | * | 4/1975 | Chieger | 280/783 |
| 5,632,471 A | * | 5/1997 | Pradel | 267/64.11 |
| 5,642,896 A | * | 7/1997 | Pierce et al. | 280/149.2 |
| 6,398,236 B1 | * | 6/2002 | Richardson | 280/86.5 |
| 6,746,031 B2 | * | 6/2004 | Carlstedt | 280/124.107 |

FOREIGN PATENT DOCUMENTS

EP 1245 476 A1 * 10/2002
FR 2678867 A1 * 1/1993

* cited by examiner

*Primary Examiner*—Ruth Ilan
(74) *Attorney, Agent, or Firm*—Krugliak, Wilkins, Griffiths & Dougherty Co, LPA; David P. Dureska; Brent L. Moore (57) ABSTRACT

A tank for containing compressed air for supplying the air to one or more pneumatically-operated components, devices, or systems of a heavy-duty vehicle such as a tractor-trailer or straight truck, also serves as part of the structure of the frame or subframe of the vehicle. The frame or subframe includes a pair of spaced-apart, parallel, elongated and longitudinally extending main members. One or more of the tanks also serve as interconnecting cross members of the frame or subframe structure. Each tank/cross member generally extends between and is perpendicular to the main members and is secured to the main members and/or suspension hangers and/or the air springs to form a rigid, integrated frame or subframe structure having reduced weight, yet which is capable of reacting the loads imparted to the structure by the axle/suspension system during operation of the vehicle.

36 Claims, 6 Drawing Sheets

VEHICLE FRAME HAVING AIR TANK CROSS MEMBER

CROSS-REFERENCE TO RELATED APPLICATION

This application is a continuation-in-part of application Ser. No. 10/669,106, filed on Sep. 22, 2003.

BACKGROUND OF THE INVENTION

1. Technical Field

The invention relates to vehicle primary frames and subframes, and in particular to frames and subframes of heavy-duty vehicles, including articulated vehicles such as tractor-trailers or semi-trailers, straight trucks, and dump trucks. More particularly, the present invention relates to the utilization of a compressed air tank, commonly found on such vehicles for supplying air to various pneumatically-operated vehicle components, as a structural member of the frame or subframe.

2. Background Art

It is well known in the heavy-duty vehicle art that articulated vehicles such as tractor-trailers, straight trucks, dump trucks, and the like, typically employ suspension assemblies of various types which are located between the wheel axles and the vehicle frame or subframe. These suspensions serve to support the vehicle and its load upon the wheel axles and tires and provide a smooth ride, despite uneven road conditions and the like, to cargo and/or passengers being carried by the vehicle.

Suspension assemblies may be either directly interposed between the vehicle frame and the wheel axle assemblies, or between the wheel axle assemblies and a subframe that typically is movably mounted on the primary vehicle frame of certain types of tractor-trailers and which is commonly referred to as a "slider". One such prior art slider application which could incorporate the instant invention is shown in U.S. Pat. No. 5,642,896, which is hereby fully incorporated by reference herein.

It is understood that both vehicle primary frames and secondary frames or subframes typically utilize a pair of spaced-apart, parallel, elongated and longitudinally-extending main members, and a plurality of transversely-extending, spaced-apart and parallel cross members which are perpendicular to the main members and are secured thereto to form an integral rigid frame or subframe structure.

It is also well known that heavy-duty vehicles of the type set forth hereinabove typically include pneumatically-operated devices or systems, including air brakes and air suspensions, as well as various other pneumatic components that might be used depending on the particular vehicle type and/or application. A pressurized or compressed air reservoir or tank is, accordingly, required equipment on such vehicles to enable air to be supplied to such pneumatic devices, systems or components for proper operation. Generally, such air tanks either are bolted to the frame or subframe cross members or longitudinal members in many possible configurations, with or without adapting brackets, and are not a structural component of the frame or subframe. However, such an arrangement adds weight to the vehicle and takes up valuable space within the frame or subframe itself, with both consequences generally being undesirable.

Instead, it is generally desirable to reduce the weight of such heavy-duty vehicles and simplify their construction as much as possible. The present invention solves such problems by enabling the air tank to double as a structural member of the vehicle frame or subframe, by replacing one or more cross members with one or more tanks to achieve weight reduction and structural simplicity, and at the same time maintain or increase the structural integrity of the frame or subframe.

SUMMARY OF THE INVENTION

Objectives of the present invention include providing a heavy-duty vehicle frame or subframe having a simplified structure and reduced weight, yet the same or improved structural integrity as compared to prior art frames or subframes, for reacting side, fore-aft, vertical, and racking loads.

Another objective of the present invention includes providing such an improved heavy-duty vehicle frame or subframe which can be efficiently manufactured and incorporated into a vehicle, and which is easy to maintain.

These objectives and advantages are obtained by the improved vehicle frame having an air tank cross member, the general nature of which may be stated as including a vehicle having a front end and a real end and a frame, and further having at least one vehicle component requiring compressed air, the frame having at least a pair of spaced-apart main members extending in the directions of the front and rear ends, and at least one suspension assembly hanger depending from each one of the main members, wherein the improvement comprises, a vessel for storing the compressed air, the vessel being pneumatically connected to the compressed air-requiring vehicle component, the vessel having a pair of ends, each one of the vessel ends being sealed by a respective one of a pair of end caps, the vessel being disposed generally perpendicular to the main members and the suspension assembly hangers, the vessel extending between and being secured at each one of the vessel ends to a respective one of a pair of brackets, each one of the brackets being secured to respective ones of the main members and the suspension assembly hangers, fox forming part of the structure of the frame, so that the frame reacts loads imposed on the frame during operation of the vehicle.

These objectives and advantages are also obtained by the improved vehicle frame of the present invention having an air tank cross member, the general nature of which may be stated as including a vehicle having a front end and a rear end and a frame, and further having at least one vehicle component requiring compressed air, the frame having at least a pail of spaced-apart main members extending in the directions of the front and rear ends, at least one suspension assembly air spring mounted on each one of the main members, and at least one suspension assembly hanger depending from each one of the main members, wherein the improvement comprises, a vessel for storing the compressed air, the vessel being pneumatically connected to the compressed air-requiring vehicle component, the vessel having a pair of ends, each one of the vessel ends being sealed by a respective one of a pair of end caps, the vessel being disposed generally perpendicular to the main members, the vessel extending between and being secured at each one of the vessel ends to a respective one of a pair of brackets, each one of the brackets being secured to respective ones of the main members and the suspension assembly air springs, for forming part of the structure of the frame, so that the frame reacts loads imposed on the frame during operation of the vehicle.

These objectives and advantages are further obtained by the improved vehicle frame of the present invention having an air tank cross member, the general nature of which may be stated as including a vehicle having a front end and a rear end and a frame, and further having at least one vehicle component requiring compressed air, the frame having at least a pair of spaced-apart main members extending in the directions of the front and rear ends, at least one suspension assembly air spring mounted on each one of the main members, and at least one suspension assembly hanger depending from each one of the main members, wherein the improvement comprises, a vessel for storing the compressed air, the vessel being pneumatically connected to the compressed air-requiring vehicle component, the vessel having a pair of ends, each one of the vessel ends being sealed by a respective one of a pair of end caps, the vessel being disposed generally perpendicular to the main members, the vessel extending between and being secured at each one of the vessel ends to a respective one of a pair of brackets, each one of the brackets being secured to respective ones of the main members, the suspension assembly hangers, and the suspension assembly air springs, for forming part of the structure of the frame, so that the frame reacts loads imposed on the frame during operation of the vehicle.

These objectives and advantages are even further obtained by the improved vehicle frame of the present invention having an air tank cross member, the general nature of which may be stated as including a vehicle having a front end and a rear end and a frame, and further having at least one vehicle component requiring compressed air, the frame having at least a pair of spaced-apart main members extending in the directions of the front and rear ends, and at least one suspension assembly hanger depending from each one of the main members, wherein the improvement comprises, a vessel for storing the compressed air, the vessel being pneumatically connected to the compressed air-requiring vehicle component, the vessel having a pair of ends, each one of the vessel ends being sealed by a respective one of a pair of brackets, the vessel being disposed generally perpendicular to the main members and the suspension assembly hangers, each one of the brackets being secured to respective ones of the main members and the suspension assembly hangers, for forming part of the structure of the frame, so that the frame reacts loads imposed on the frame during operation of the vehicle.

These objectives and advantages are yet even further obtained by the improved vehicle frame of the present invention having an air tank cross member, the general nature of which may be stated as including a vehicle having a front end and a rear end and a frame, and further having at least one vehicle component requiring compressed air, the frame having at least a pair of spaced-apart main members extending in the directions of the front and rear ends, at least one suspension assembly air spring mounted on each one of the main members, and at least one suspension assembly hanger depending from each one of the main members, wherein the improvement comprises, a vessel for storing the compressed air; the vessel being pneumatically connected to the compressed air-requiring vehicle component, the vessel having a pair of ends, each one of the vessel ends being sealed by a respective one of a pair of brackets, the vessel being disposed generally perpendicular to the main members, each one of the brackets being secured to respective ones of the main members and the suspension assembly air springs, for forming part of the structure of the frame, so that the frame reacts loads imposed on the frame during operation of the vehicle.

These objectives and advantages are still yet even further obtained by the improved vehicle frame of the present invention having an air tank cross member, the general nature of which may be stated as including a vehicle having a front end and a rear end and a frame, and further having at least one vehicle component requiring compressed air, the frame having at least a pair of spaced-apart main members extending in the directions of the front and rear ends, at least one suspension assembly air spring mounted on each one of the main members, and at least one suspension assembly hanger depending from each one of the main members, wherein the improvement comprises, a vessel for storing the compressed air, the vessel being pneumatically connected to the compressed air-requiring vehicle component, the vessel having a pair of ends, each one of the vessel ends being sealed by a respective one of a pair of brackets, the vessel being disposed generally perpendicular to the main members, each one of the brackets being secured to respective ones of the main members, the suspension assembly hangers, and the suspension assembly air springs, for forming part of the structure of the frame, so that the frame reacts loads imposed on the frame during operation of the vehicle.

BRIEF DESCRIPTION OF THE DRAWINGS

The preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

The general concept of the present invention is to replace one or more of the cross members of a heavy-duty vehicle frame or subframe with one or more air tanks which otherwise would not form a structural part of the frame or subframe. It is understood that the present invention can be applied to heavy-duty vehicle primary frames or secondary frames, the latter being commonly referred to as sliders or subframes, without affecting the overall concept or advantages obtained by the invention. More specifically, the air tank serves a dual purpose, including its usual purpose as a storage reservoir for compressed or pressurized air used to operate various devices, components and/or systems of a heavy-duty vehicle such as an air suspension. In the present invention, the air tank serves the additional purpose of replacing one or more of the cross members in the vehicle frame or subframe structure. One or more tanks are mounted in such a way as to be structurally integrated into the frame or subframe, thereby enabling the overall structure to withstand the forces typically imparted thereto in an operating environment, including vertical loads, side loads, fore-aft loads, and racking loads.

Figure 1:
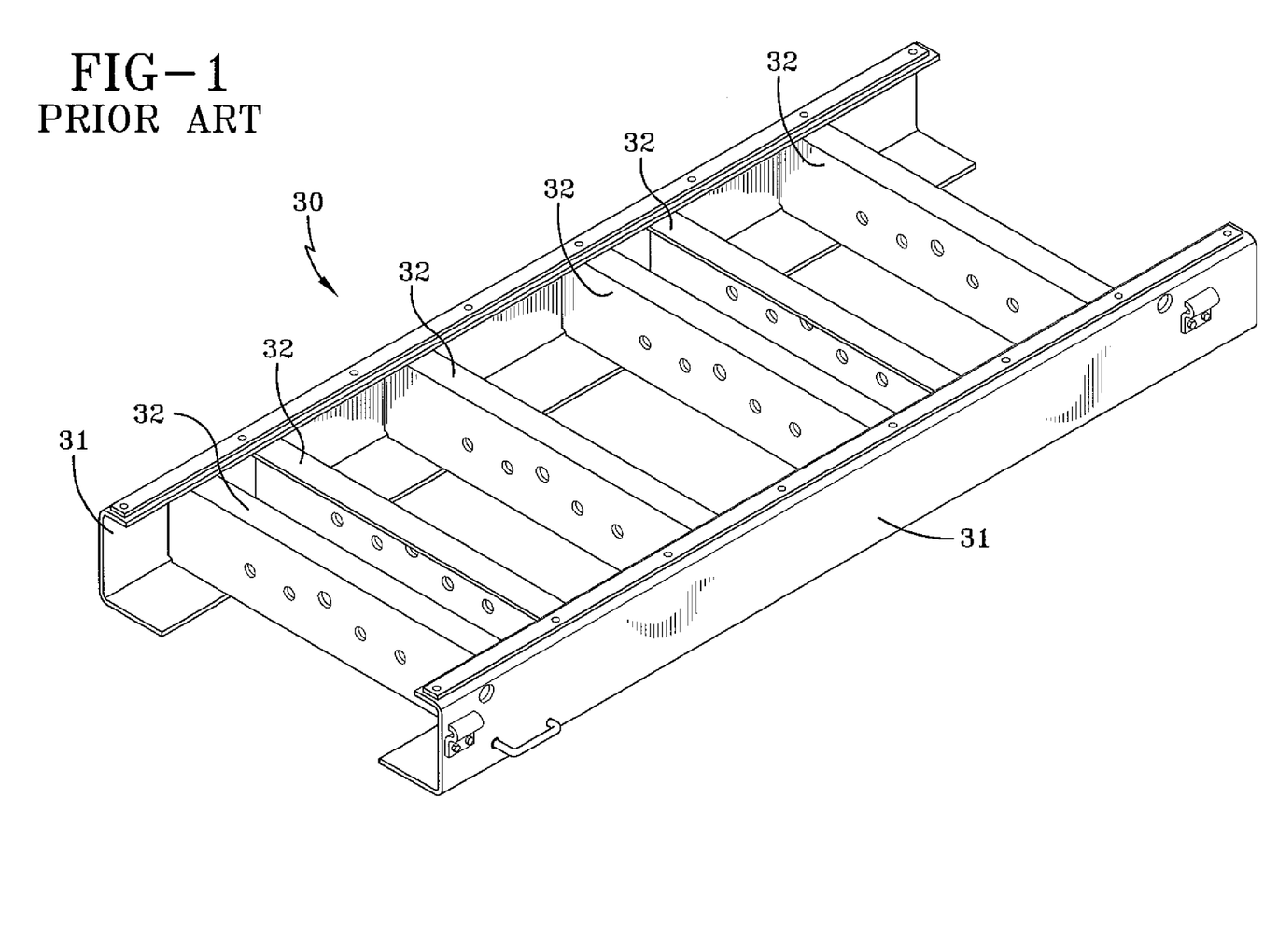
FIG. 1 is a perspective view of a typical prior art subframe having a pair of longitudinal main members and a plurality of cross members.

Movable subframe assemblies such as sliders and fixed primary frame assemblies both typically include a pair of spaced-apart, parallel, elongated and longitudinally-extending main members and a plurality of spaced-apart, parallel and transversely-extending cross members which are perpendicular to and secured to the main members in a manner well known in the art as shown in FIG. 1. Although FIG. 1 represents a movable subframe 30 having a pair of spaced-apart, parallel, elongated and longitudinally-extending main members 31 and a plurality of transversely-extending, spaced-apart and parallel cross members 32, it is understood that fixed primary frames have a similar construction, but merely are longer and generally extend the entire length of a certain portion of a vehicle such as the trailer of a tractor-trailer. Various embodiments of the present invention, satisfying the same overall theme, are presented and described hereinbelow. It is understood that although the embodiments of the invention described below and shown in the drawings represent fixed primary frame member structures, the inventive structure can be applied in a similar manner to shorter movable subframe structures of the type shown in FIG. 1.

Figure 2:
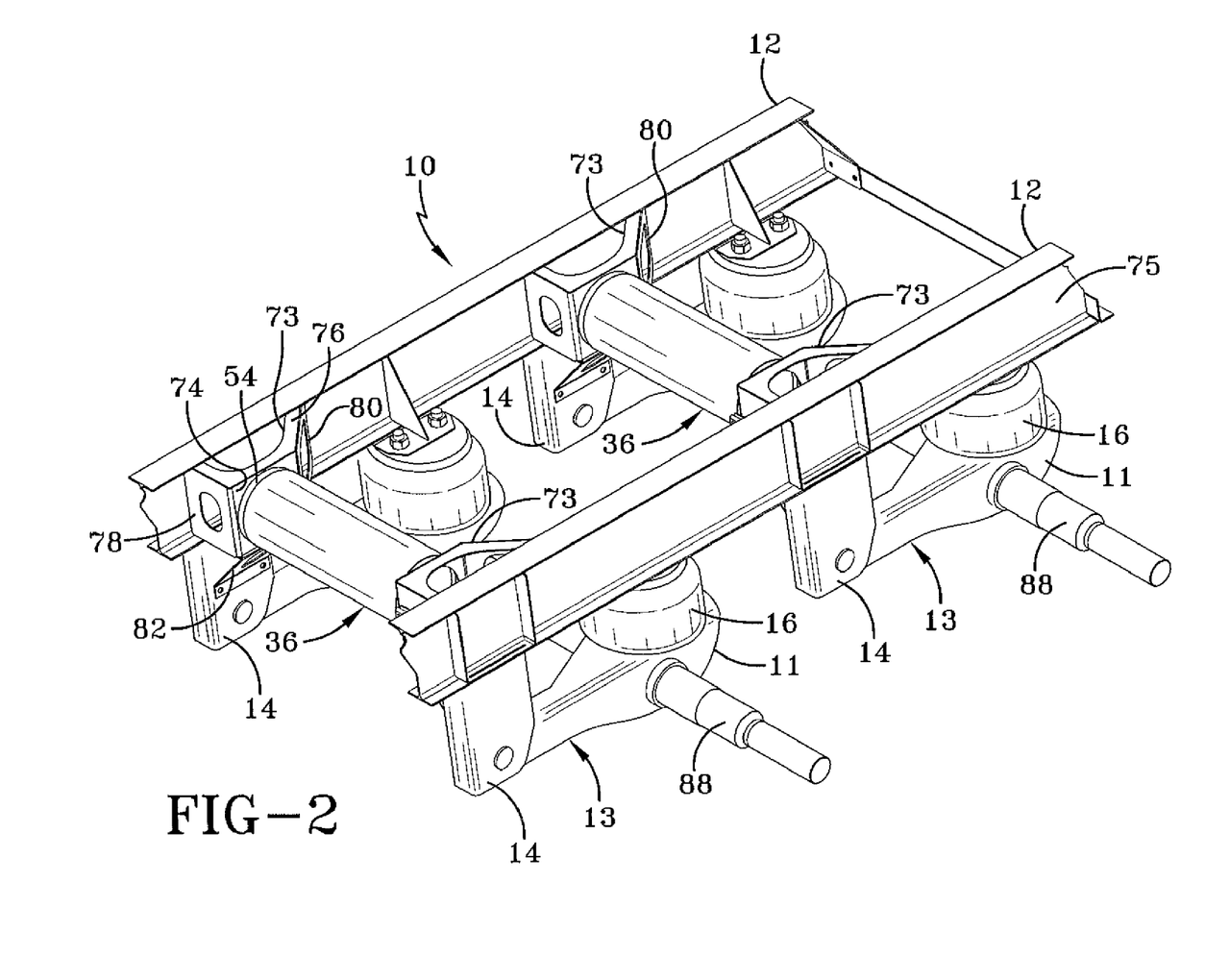
FIG. 2 is a fragmentary perspective view of a first embodiment frame structure of the present invention, shown with a pair of axle/suspension systems mounted beneath the structure, and further showing the manner in which air tanks are incorporated into the frame or subframe to also serve as cross members of the structure.

With reference now to FIG. 2 of the drawings, it can be seen that a primary frame in accordance with a first embodiment of the present invention is designated generally by the numeral 10. More particularly, frame 10 includes a pair of spaced-apart, parallel, elongated, and longitudinally-extending main members 12. Each main member 12 has a suspension hanger bracket 14 mounted on and extending downwardly therefrom to pivotally receive a trailing arm beam 11 of an air suspension assembly 13 in a well-known manner. An air spring 16 extends between and is attached to its respective main member 12 and the rear end of its respective beam 11 to complete the main components of suspension assembly 13. An axle 88 is captured in beams 11 of each pair of suspension assemblies 13 to complete an axle/suspension system. It is understood that additional pairs of suspension assemblies 13 (only one additional pair shown) are each mounted in an identical manner at longitudinally spaced locations beneath frame 10 for capturing transversely extending axle 88 in a manner well-known in the art. The actual number of axle/suspension systems mounted beneath frame 10 depends on factors such as the length of the frame, the intended vehicle applications, and the like.

Figure 3:
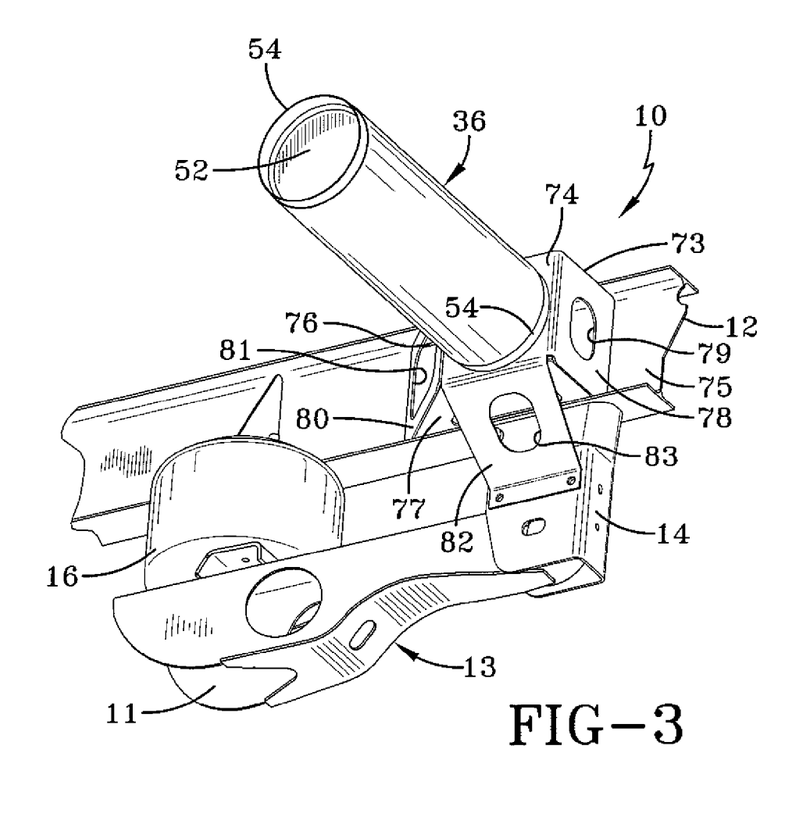
FIG. 3 is a fragmentary bottom perspective view of a portion of the structure shown in FIG. 2.

In accordance with a key feature of the present invention, and as best shown in FIGS. 2 and 3, a pair of air tanks 36 preferably each replace at least two traditional cross members, such as cross members 32 shown in prior art FIG. 1, in frame 10. Thus, each tank 36 is intended to replace at least a pair of the cross members commonly located in the vicinity of each pair of suspension assemblies 13.

Figure 4:
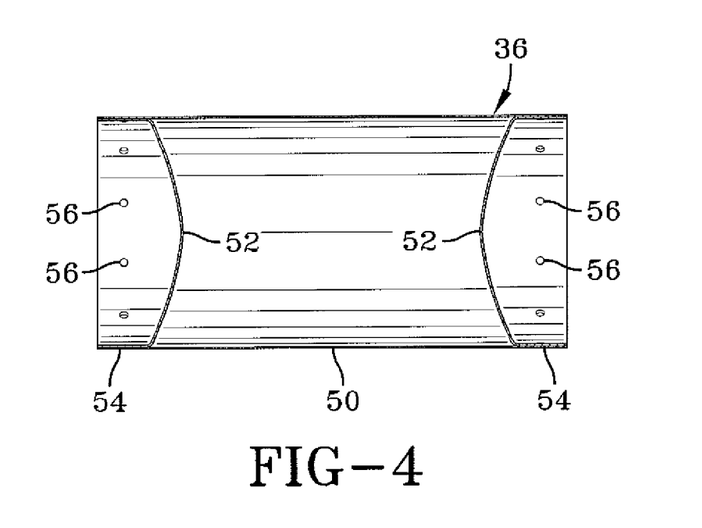
FIG. 4 is a longitudinal sectional view of the air tank shown in FIGS. 2 and 3.
Figure 5:
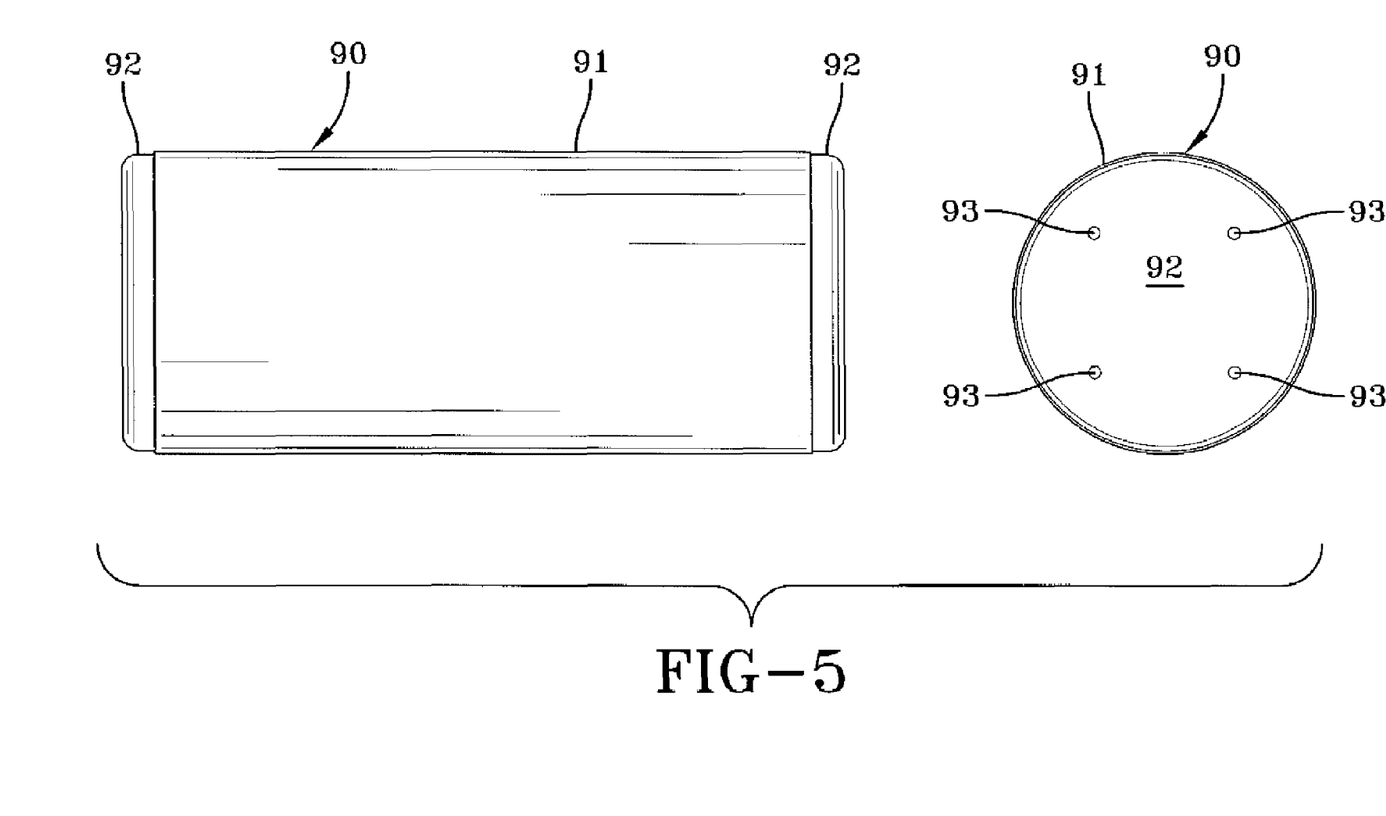
FIG. 5 is an elevational view and an end view of another type of air tank which can be utilized in the frame or subframe structures of the present invention.

With reference now to FIGS. 4 and 5, an appreciation may be obtained respecting the general nature of the structure of the air tanks suitable for implementation in first embodiment frame 10 of the invention shown in FIGS. 2 and 3, as well as in the second, third, and fourth, embodiments shown in FIGS. 6-9 and described in detail hereinbelow. As specifically shown in FIG. 4, tank 36 includes a cylindrical tank body 50 having a pair of concave inboardly recessed end caps 52 inserted into opposite ends thereof. Tank body 50 and end caps 52 typically are formed of metal and, accordingly, the end caps are circumferentially welded into the open ends of cylindrical tank body 50 by continuous welds (not shown), thereby forming sturdy mounting rings 54 at each end thereof. A plurality of circumferentially-spaced rivet holes 56 preferably are formed in each mounting ring 54, for integrating tank 36 into a frame or subframe structure as will be described in detail hereinbelow.

A second design of an air tank suitable for use in the present invention is shown in FIG. 5 and identified by numeral 90. Air tank 90 includes a cylindrical tank body 91 having a pair of generally concave outboardly recessed end caps 92 inserted into opposite open ends thereof. Tank body 91 and end caps 92 typically are formed of metal and, accordingly, the end caps are circumferentially welded into the ends of cylindrical body 91 by continuous welds (not shown). A plurality of spaced threaded bolt holes 93 preferably are formed in the outboardmost flat surface of each end cap 92 for incorporating tank 90 into a frame or subframe structure in a suitable manner.

Referring now back to FIG. 2, and in accordance with a key feature of the present invention, the structure of first embodiment frame 10 is completed as follows. A mounting bracket 73, preferably fabricated from metal, is secured to its respective main member 12 and suspension assembly hanger bracket 14 by appropriate means such as welding, riveting or the like.

In particular, mounting bracket 73 includes a base plate 74 to which tank 36 is fixed, such as by placing rivets in mounting ring holes 56 of the tank and corresponding aligned openings formed in a flange or the like (not shown) of base plate 74. Another fastening method, such as welding, also is contemplated. Top and bottom plates 76, 77, respectively, extend orthogonally outboardly from base plate 74 and are attached to main member 12 as by welding or bolting. Mounting bracket 73 also includes legs 78, 80, and 82 extending outboardly from base plate 74. Leg 78, which is joined to top and bottom plates 76, 77, extends to and abuts main member 12 and preferably is welded thereto. In the preferred embodiment of mounting bracket 73, leg 78 is substantially orthogonal to a web portion 75 of main member 12, reinforces it, and reacts all forces encountered by the vehicle during operation, including side, vertical, fore-aft, racking, and torsional forces. Leg 80, also joined to top and bottom plates 76, 77, is angled from base plate 74 and outboardly rearwardly away from tank 36 and toward main member web 75 where it is similarly welded. Angled leg 80 functions to react all such loads as well. Finally, leg 82 angles downwardly outboardly from base plate 74 and toward hanger bracket 14 to which it is riveted, welded, or otherwise appropriately affixed. Angled leg 82 also assists in reacting all of the above-mentioned forces/loads, as will be readily understood and appreciated by those skilled in the art. It is further understood that each one of legs 78, 80, 82 may react certain ones of the loads especially efficiently. Legs 78, 80, 82 are formed with apertures 79, 81, 83 therein, respectively, as shown in FIG. 3. These apertures serve the primary purpose of weight reduction.

It will also be appreciated that legs 78, 80, 82, in combination with base plate 74, serve to define a truss structure for force transfer and dissipation. These triangulated legs include a leg 78 which is substantially parallel to the axis of the cross member formed by tank 36 and orthogonal to the longitudinal axis of main member 12. Leg 80 is angled with respect to these axes, while intersecting both. Leg 82 extends obliquely with respect to the axis of tank 36 and terminates beneath the axis of main member 12. Accordingly, the truss so defined is capable of reacting and withstanding the forces normally incident to and received by a cross member in primary frame 10 or a slider. It will be appreciated that the size of truss 73 may be varied by altering the length of tank 36. For any given volume of tank 36, as the length of the tank decreases, thus requiring increased truss size, the diameter of tank 36 must necessarily increase to maintain air volume requirements for FMUSS-121 compliance of the air brake system. With this understanding and the desirability of devising a mounting bracket adapted for force transfer, one skilled in the art can develop a truss of appropriate size to achieve the desired force vector transfer by simply selecting an appropriate length for tank 36 and adjusting its diameter accordingly. As noted hereinabove, various tank structures have been contemplated fox use in the frame or subframe of the present invention. Moreover, brackets 73 could be attached directly to the ends of tank 36, without any intervening structure such as end caps 52, 92 and/or mounting rings 54, whereby the brackets themselves would function to seal the open ends of the tank.

Figure 6:
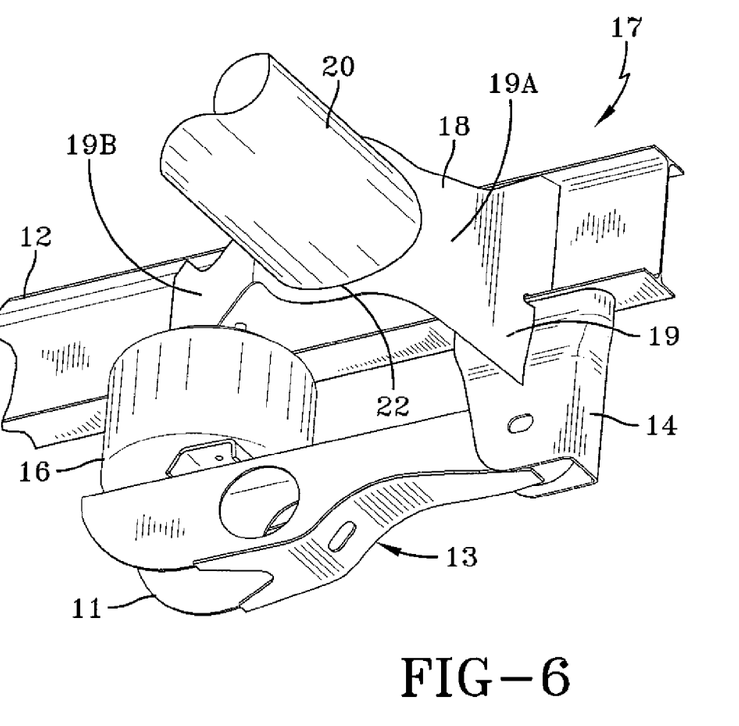
FIG. 6 is a view similar to FIG. 3, and showing a second embodiment frame structure of the present invention.
Figure 7:
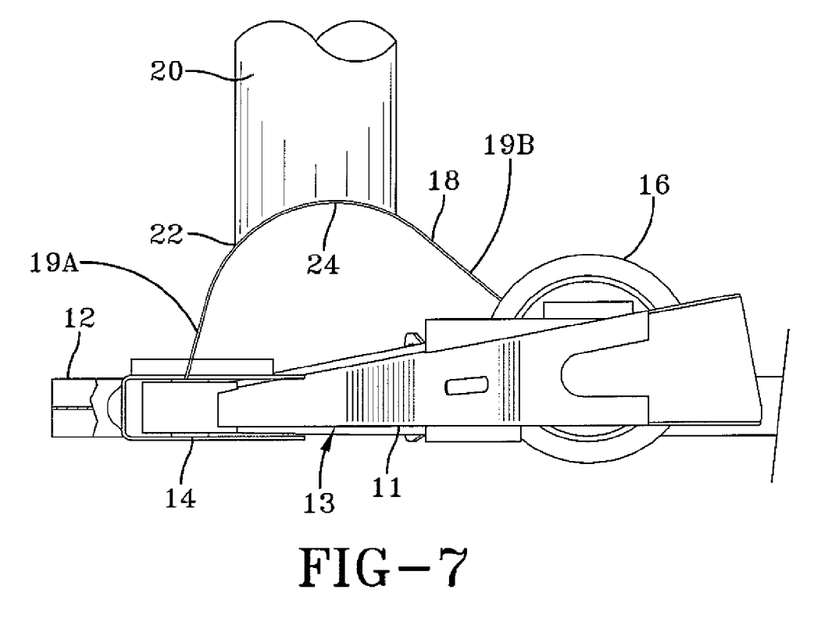
FIG. 7 is a fragmentary bottom plan view of the embodiment of FIG. 6, with portions broken away and in section.

A second embodiment of the frame of the present invention is shown in FIGS. 6 and 7 and is indicated generally at 17. A bracket 18, preferably formed of a sturdy material such as metal, is mounted on the inboard surface of each main member 12 (only one shown), hanger 14, and the upper metal plate (not shown) of air spring 16 by any suitable means such as welds or fasteners. As shown in FIGS. 6 and 7, mounting bracket 18 has a generally cupped or curvate shape A cylindrical-shaped air tank 20, which is yet another design of a vessel in addition to tanks 36 and 90 shown in FIGS. 4 and 5, respectively, is secured between opposed mounting brackets 18 by a continuous weld (not shown) extending about the entire interface 22 of each of the cylindrical ends of tank 20 and its respective mounting bracket 18. The welds at each interface 22 provide an airtight closure to tank 20, it being understood that each bracket 18 also functions as an end cap or closure 24 at its respective end of tank 20.

It thus clearly can be seen by referring to FIGS. 6 and 7 and the description immediately above that tank 20 serves as an integrated and rigid structural frame cross member between main members 12. The arcuate or cupped configuration of each bracket 18, extending fore and aft from tank 20 along its respective main member 12, having a leg 19A extending generally frontwardly downwardly into attachment with frame hanger 14, and having an additional leg 19B extending generally rearwardly downwardly into attachment with the upper metal plate (not shown) of air spring 16, provides force restraint between the main members against vertical, side, fore-aft, and racking loads characteristically incident to the axle/suspension systems used on heavy-duty vehicles such as tractor-trailers. Of course, as in first embodiment 10, a hanger 14 pivotally mounts a beam 11 of a suspension assembly 13, which also includes a ride air spring 16, and a spaced pair of the suspension assemblies captures an axle (not shown). The arcuate or cupped configuration of brackets 18 also allows them to function as end caps 24 to the pressure vessel or tank 20. Thus, since the assembly comprising air tank 20 and uniquely configured mounting brackets 18 preferably replaces at least two cross member structures such as member 32 (FIG. 1) otherwise used in such vehicle frames, frame 17 gains the benefits of reduced weight while maintaining or even improving the structural integrity of the frame, and simplifies the frame structure to provide additional space for mounting other vehicle components or structures.

Figure 8:
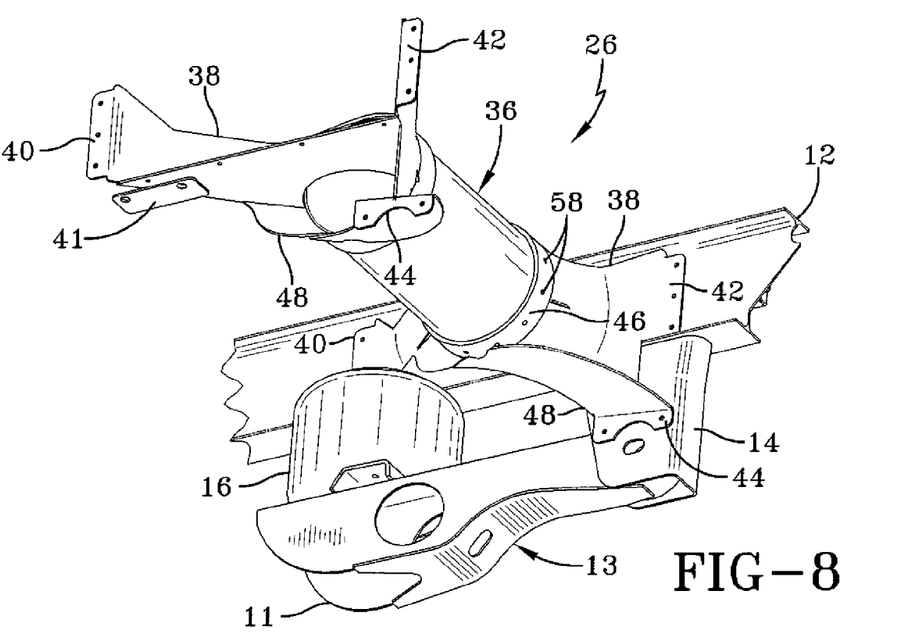
FIG. 8 is a view similar to FIGS. 3 and 6, and showing a third embodiment frame structure of the present invention.

Referring now to FIG. 8, it can be seen that a frame assembly in accordance with a third embodiment of the invention is indicated generally at 26. For purposes of illustration, only a single longitudinal main member 12 of frame 26 is shown, and like first and second embodiment frames 10 and 17, respectively, of the present invention, has a hanger bracket 14 depending therefrom and a beam 11 of a suspension assembly 13 mounted on the hanger and main member 12 in a typical fashion. An air spring 16 extends between the tear end of suspension arm 11 and main member 12. As before, those skilled in the art will of course appreciate the existence of a transversely-spaced, parallel second elongated longitudinal main member 12 with an associated suspension hanger bracket 14, nailing arm or beam 11, and air spring 16, with beams 11 of suspension assemblies 13 capturing an axle (not shown) to form an axle/suspension system.

Air tank 36 doubles as a frame cross member and extends between main members 12 in a similar manner to the frame embodiment set forth in FIG. 6. More specifically, air tank 36 is secured to opposed main members 12 by appropriate mounting brackets 38. Each mounting bracket 38 preferably is formed of a suitable composite material and has flanges or feet 40, 41, 42, 44 for purposes of attachment to other portions of frame main member 12, hanger bracket 14, and the upper metal plate (not shown) of air spring 16. In particular, feet 40, 42 are longitudinally spaced along an inboard portion of main member 12. Foot 41 attaches to the upper metal plate of air spring 16, and foot 44 attaches to hanger bracket 14. Feet 40, 41, 42, 44 in turn each are secured to its respective main member 12, air spring 16, or suspension hanger bracket 14 by suitable bolts, rivets or the like (not shown). A leg 48, formed integral with mounting bracket 38, extends outboardly from an area adjacent an annular bracket collar 46 to foot 44, to enable the foot to abut hanger 14 as illustrated. Since each mounting bracket 38 is formed of a non-metallic molded plastic composite material, fasteners must be employed, rather than welding or other similar attachment methods. The inboardmost end of each mounting bracket 38 is formed with annular collar 46 and is configured to receive a respective one of the ends of air tank 36.

More particularly, tank rivet holes 56 are adapted to align with corresponding circumferentially-spaced rivet holes 58 formed in collar 46 of mounting bracket 38 as shown in FIG. 8. Accordingly, mounting rings 54 and collars 46 isolate air tank body 50 from any tool or securing implement which might otherwise penetrate the tank body during assembly of frame 26. Thus, tank mounting rings 54 are engaged and inserted into bracket collars 46 and openings 56, 58 can be aligned to receive rivets (not shown) to secure tank 36 to brackets 38.

As clearly shown, mounting bracket 38 generally is of a triangular-based shape, with feet 40, 41, 42, 44 interconnecting tank 36 as a cross member generally between opposed main members 12, air springs 16, and hanger brackets 14. Accordingly, the rigid cross member structure created by air tank 36 and received by mounting brackets 38 is capable of transferring the various forces normally reacted by suspension assemblies 13 during vehicle operation. Specifically, triangulated mounting bracket 38 withstands vertical loading, side loading, fore-aft loading, and racking forces as characteristically impact such suspension assemblies.

As noted above, it is contemplated that mounting bracket 38 may be formed of a suitable plastic or composite material given to ease of manufacture through appropriate molding techniques. Accordingly, a broad range of configurations may be devised to achieve desired mounting and force reacting features while still conforming to the concept of the present invention.

Figure 9:
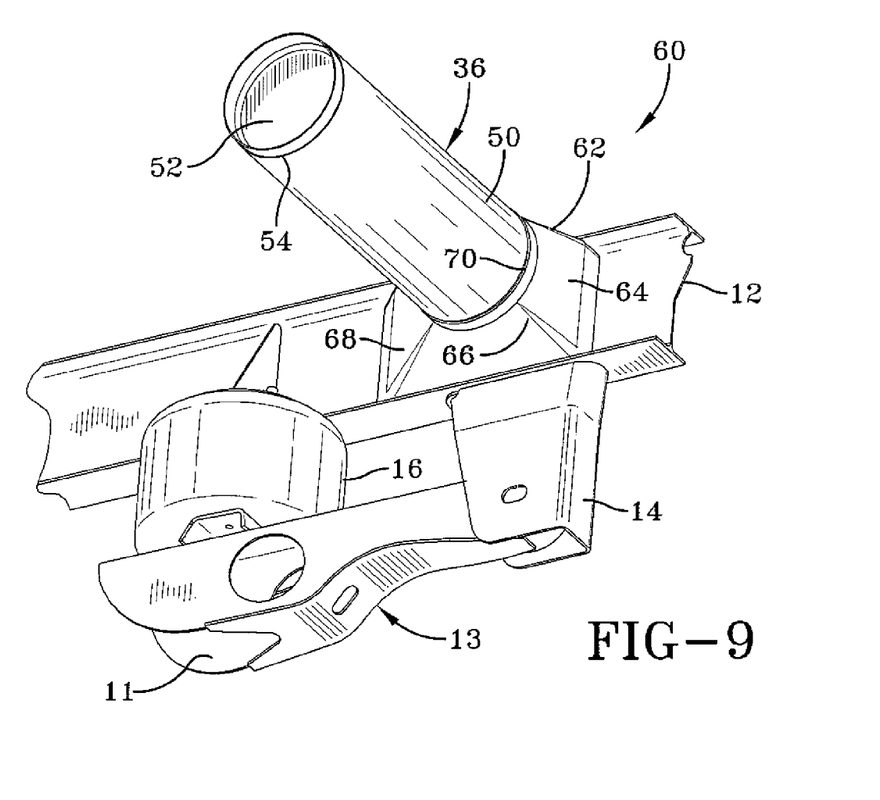
FIG. 9 is a view similar to FIGS. 3, 6 and 8, and showing a fourth embodiment frame structure of the present invention.

Referring now to FIG. 9, a fourth embodiment frame of the present invention is designated generally by the numeral 100. In this inventive frame embodiment, mounting brackets 102 preferably are fabricated from metal and are attached to opposed main members 12 (only one shown) as by welding or the like. Mounting rings 54 at opposite ends of air tank 36 each are received by a flange or the like formed on its respective bracket 102 and may be secured thereto by welding, rivets, or other suitable fastening means (not shown). Each bracket 102 extends outboardly from its respective end of tank 36 to main member 12 and to the upper metal plate (not shown) of air spring 16 and is welded, bolted or riveted (not shown) thereto. It is important to note that tank 36 and brackets 102 are disposed adjacent to air springs 16. Accordingly, the rigid cross member structure created by air tank 36 and received by mounting brackets 102 is capable of transferring the various forces normally reacted by suspension assemblies 13 during vehicle operation. Specifically, mounting bracket 102 withstands vertical loading, side loading, fore-aft loading, and racking forces as characteristically impact such suspension assemblies. Thus, it can be seen that the present invention contemplates various locations for the air tank/cross members and their mounting brackets, but all of the locations shown and described herein achieve appropriate force transfer involving suspension assembly 13, an axle (not shown), and other vehicle components. Moreover, brackets 102 could be attached directly to the ends of tank 36, without any intervening structure such as end caps 52 and/or mounting rings 54, whereby the brackets themselves would function to seal the open ends of the tank.

It is thus understood that the various embodiments of the present invention can be applied to fixed primary vehicle frames, or moveable subframes or sliders, without effecting the overall concept of the present invention. It is further understood that the configuration and material from which the tanks and brackets for attaching tanks as a rigid cross member in the frame or subframe structure can be varied, also without affecting the overall concept of the present invention directed to replacing traditional frame or subframe cross members with the pressurized air tank. It also is understood that various means can be used to secure the brackets and air tank into the frame or subframe structure, including welds, fasteners, and the like.

Moreover, although the preferred embodiment of the present invention contemplates replacing all of the traditional cross members with one or more air tanks, it is understood that if desired, less than all of the prior art cross members could be replaced. It is further understood that the present invention is not limited to use only with the representative suspension assembly shown and described, but could be used to support numerous other types of axle/suspension systems, axles and suspension assemblies.

Thus, it can be seen that the location of each cross member/air tank can extend between the frame main members at a location adjacent to ride air springs 16, adjacent to hangers 14, or at a location intermediate the hangers and air springs, without affecting the overall concept of the present invention. It is father understood that while additional gussets, brackets, and the like, may be required to achieve optimal structural integrity of the frame or subframes of the present invention, an overall weight reduction to the frame or subframe over prior art structures still will be realized.

Accordingly, the improved vehicle frame or subframe of the present invention utilizing one or more air tank cross members is simplified, provides an effective, safe, inexpensive, and efficient structure, which achieves all the enumerated objectives, provides for eliminating difficulties encountered with prior frame and subframe structures, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vehicle frame or subframe is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A vehicle having a front end and a rear end and a frame, and further having at least one vehicle component requiring compressed air, said frame having at least a pair of spaced-apart main members extending in the directions of said front and rear ends, and at least one suspension assembly hanger depending from each one of said main members, wherein the improvement comprises:

a vessel for storing said compressed air, said vessel being pneumatically connected to said compressed air-requiring vehicle component, the vessel having a pair of ends, each one of said vessel ends being sealed by a respective one of a pair of end caps, said vessel being disposed generally perpendicular to the main members and said suspension assembly hangers, the vessel extending between and being secured at each one of the vessel ends to a respective one of a pair of brackets, each one of said brackets being secured to respective ones of said main members and the suspension assembly hangers, for forming part of the structure of the frame, so that said frame reacts loads imposed on said vehicle during operation of the vehicle.

2. The vehicle of claim 1, in which said frame is selected from the group consisting of a primary fixed frame and a secondary moveable frame.

3. The vehicle of claim 1, in which said frame main members are elongated and parallel.

4. The vehicle of claim 3, in which said vessel is a generally cylindrical shape.

5. The vehicle of claim 4, in which said vehicle includes a suspension assembly beam mounted on each one of said hangers; in which said beam includes a first end mounted on the hanger and a second end attached to a suspension assembly air spring; and in which said suspension assembly air spring is mounted on a respective one of said main members.

6. The vehicle of claim 5, in which said vessel extends between and is attached to said brackets adjacent to said hangers.

7. A vehicle having a front end and a rear end and a frame, and further having at least one vehicle component requiring compressed air, said frame having at least a pair of spaced-apart main members extending in the directions of said front and rear ends, at least one suspension assembly air spring mounted on each one of said main members, and at least one suspension assembly hanger depending from each one of said main members, wherein the improvement comprises:

a vessel for storing said compressed air, said vessel being pneumatically connected to said compressed air-requiring vehicle component, the vessel having a pair of ends, each one of said vessel ends being sealed by a respective one of a pair of end caps, said vessel being disposed generally perpendicular to the main members, the vessel extending between and being secured at each one of the vessel ends to a respective one of a pair of brackets, each one of said brackets being secured to respective ones of said main members and said suspension assembly air springs, for forming part of the structure of the frame, so that said frame reacts loads imposed on said vehicle during operation of the vehicle.

8. The vehicle of claim 7, in which said frame is selected from the group consisting of a primary fixed frame and a secondary moveable frame.

9. The vehicle of claim 7, in which said frame main members are elongated and parallel.

10. The vehicle of claim 9, in which said vessel is a generally cylindrical shape.

11. The vehicle of claim 10, in which said vehicle includes a suspension assembly beam mounted on each one of said hangers; and in which said beam includes a first end mounted on the hanger and a second end attached to said suspension assembly air spring.

12. The vehicle of claim 11, in which said vessel extends between and is attached to said brackets adjacent to said suspension assembly air springs.

13. A vehicle having a front end and a rear end and a frame, and further having at least one vehicle component requiring compressed air, said frame having at least a pair of spaced-apart main members extending in the directions of said front and rear ends, at least one suspension assembly air spring mounted on each one of said main members, and at least one suspension assembly hanger depending from each one of said main members, wherein the improvement comprises:
a vessel for storing said compressed air, said vessel being pneumatically connected to said compressed air-requiring vehicle component, the vessel having a pair of ends, each one of said vessel ends being sealed by a respective one of a pair of end caps, said vessel being disposed generally perpendicular to the main members, the vessel extending between and being secured at each one of the vessel ends to a respective one of a pair of brackets, each one of said brackets being secured to respective ones of said main members, said suspension assembly hangers, and said suspension assembly air springs, for forming part of the structure of the frame, so that said frame reacts loads imposed on said vehicle during operation of the vehicle.

14. The vehicle of claim 13, in which said frame is selected from the group consisting of a primary fixed frame and a secondary moveable frame.

15. The vehicle of claim 13, in which said frame main members are elongated and parallel.

16. The vehicle of claim 15, in which said vessel is a generally cylindrical shape.

17. The vehicle of claim 16, in which said vehicle includes a suspension assembly beam mounted on each one of said hangers; in which said beam includes a first end mounted on the hanger and a second end attached to said suspension assembly air spring.

18. The vehicle of claim 17, in which said vessel extends between and is attached to said brackets intermediate said suspension assembly air springs and said hangers.

19. A vehicle having a front end and a rear end and a frame, and further having at least one vehicle component requiring compressed air, said frame having at least a pair of spaced-apart main members extending in the directions of said front and rear ends, and at least one suspension assembly hanger depending from each one of said main members, wherein the improvement comprises:
a vessel for storing said compressed air, said vessel being pneumatically connected to said compressed air-requiring vehicle component, the vessel having a pail of ends, each one of said vessel ends being sealed by a respective one of a pair of brackets, said vessel being disposed generally perpendicular to the main members and said suspension assembly hangers, each one of said brackets being secured to respective ones of said main members and the suspension assembly hangers, for forming part of the structure of the frame, so that said frame reacts loads imposed on said vehicle during operation of the vehicle.

20. The vehicle of claim 19, in which said frame is selected from the group consisting of a primary fixed frame and a secondary moveable frame.

21. The vehicle of claim 19, in which said frame main members are elongated and parallel.

22. The vehicle of claim 21, in which said vessel is a generally cylindrical shape.

23. The vehicle of claim 22, in which said vehicle includes a suspension assembly beam mounted on each one of said hangers; in which said beam includes a first end mounted on the hanger and a second end attached to a suspension assembly air spring; and in which said suspension assembly air spring is mounted on a respective one of said main members.

24. The vehicle of claim 23, in which said vessel extends between and is attached to said brackets adjacent to said hangers.

25. A vehicle having a front end and a rear end and a frame, and further having at least one vehicle component requiring compressed air, said frame having at least a pair of spaced-apart main members extending in the directions of said front and rear ends, at least one suspension assembly air spring mounted on each one of said main members, and at least one suspension assembly hanger depending from each one of said main members, wherein the improvement comprises:
a vessel for storing said compressed air, said vessel being pneumatically connected to said compressed air-requiring vehicle component, the vessel having a pair of ends, each one of said vessel ends being sealed by a respective one of a pair of brackets, said vessel being disposed generally perpendicular to the main members, each one of said brackets being secured to respective ones of said main members and said suspension assembly air springs, for forming part of the structure of the frame, so that said frame reacts loads imposed on said vehicle during operation of the vehicle.

26. The vehicle of claim 25, in which said frame is selected from the group consisting of a primary fixed frame and a secondary moveable frame.

27. The vehicle of claim 25, in which said frame main members are elongated and parallel.

28. The vehicle of claim 27, in which said vessel is a generally cylindrical shape.

29. The vehicle of claim 28, in which said vehicle includes a suspension assembly beam mounted on each one of said hangers; in which said beam includes a first end mounted on the hanger and a second end attached to said suspension assembly air spring.

30. The vehicle of claim 29, in which said vessel extends between and is attached to said brackets adjacent to said suspension assembly air springs.

31. A vehicle having a front end and a tear end and a frame, and further having at least one vehicle component requiring compressed air, said frame having at least a pair of spaced-apart main members extending in the directions of said front and rear ends, at least one suspension assembly air spring mounted on each one of said main members, and at least one suspension assembly hanger depending from each one of said main members, wherein the improvement comprises:

a vessel for storing said compressed air, said vessel being pneumatically connected to said compressed air-requiring vehicle component, the vessel having a pair of ends, each one of said vessel ends being sealed by a respective one of a pair of brackets, said vessel being disposed generally perpendicular to the main members, each one of said brackets being secured to respective ones of said main members, the suspension assembly hangers, and said suspension assembly air springs, for forming part of the structure of the frame, so that said frame reacts loads imposed on said vehicle during operation of the vehicle.

32. The vehicle of claim 31, in which said frame is selected from the group consisting of a primary fixed frame and a secondary moveable frame.

33. The vehicle of claim 31, in which said frame main members are elongated and parallel.

34. The vehicle of claim 33, in which said vessel is a generally cylindrical shape.

35. The vehicle of claim 34, in which said vehicle includes a suspension assembly beam mounted on each one of said hangers; in which said beam includes a first end mounted on the hanger and a second end attached to said suspension assembly air spring.

36. The vehicle of claim 35, in which said vessel extends between and is attached to said brackets intermediate said suspension assembly air springs and said hangers.

\* \* \* \* \*

UNITED STATES PATENT AND TRADEMARK OFFICE
CERTIFICATE OF CORRECTION

PATENT NO.         : 7,503,586 B2  
APPLICATION NO.    : 11/620210  
DATED              : March 17, 2009  
INVENTOR(S)        : John Edward Ramsey It is certified that error appears in the above-identified patent and that said Letters Patent is hereby corrected as shown below:

Claim 31, Column 12, line 60, delete the word "tear" and insert therefor the word --rear--.

Signed and Sealed this

Twelfth Day of May, 2009

JOHN DOLL  
*Acting Director of the United States Patent and Trademark Office*